US012572789B2

(12) United States Patent
Hersche et al.

(10) Patent No.: US 12,572,789 B2
(45) Date of Patent: Mar. 10, 2026

(54) BLOCKWISE FACTORIZATION OF HYPERVECTORS

(71) Applicant: INTERNATIONAL BUSINESS MACHINES CORPORATION, Armonk, NY (US)

(72) Inventors: Michael Andreas Hersche, Zurich (CH); Abu Sebastian, Adliswil (CH); Abbas Rahimi, Rüschlikon (CH)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 17/809,044

(22) Filed: Jun. 27, 2022

(65) Prior Publication Data

US 2023/0419091 A1      Dec. 28, 2023

(51) Int. Cl.
*G06N 3/065* (2023.01)
(52) U.S. Cl.
CPC .................................... *G06N 3/065* (2023.01)
(58) Field of Classification Search
CPC ...... G06N 3/065; G06N 3/0635; G06N 3/042; G06N 3/044; G06N 3/045; G06N 3/048; G06N 3/0495; G06N 3/063; G06N 3/08
See application file for complete search history.

(56) References Cited

U.S. PATENT DOCUMENTS

| | | | |
|---|---|---|---|
| 8,908,978 B2 | 12/2014 | Oka et al. | |
| 10,394,930 B2 | 8/2019 | Ben-Dayan Rubin | |
| 12,293,185 B2 | 5/2025 | Vougioukas et al. | |
| 2019/0171665 A1* | 6/2019 | Navlakha | G06V 10/761 |
| 2020/0272895 A1* | 8/2020 | Cherubini | G06N 3/08 |
| 2020/0380384 A1 | 12/2020 | Karunaratne | |
| 2022/0019441 A1 | 1/2022 | Rosing et al. | |
| 2022/0059189 A1* | 2/2022 | Rosing | G06N 3/084 |
| 2023/0083502 A1 | 3/2023 | Imani | |

(Continued)

OTHER PUBLICATIONS

Karunaratne, Geethan, et al. "Energy Efficient In-memory Hyperdimensional Encoding for Spatio-temporal Signal Processing." arXiv preprint arXiv:2106.11654 (Jun. 22, 2021). (Year: 2021).*

(Continued)

*Primary Examiner* — Randall K. Baldwin
(74) *Attorney, Agent, or Firm* — Joseph P. Curcuru

(57)      ABSTRACT

Embodiments are disclosed for a method. The method includes determining a granularity of hypervectors. The method also includes receiving an input hypervector representing a data structure. Additionally, the method includes performing an iterative process to factorize the input hypervector into individual hypervectors representing the cognitive concepts. The iterative process includes, for each concept: determining an unbound version of a hypervector representing the concept by a blockwise unbinding operation between the input hypervector and estimate hypervectors of other concepts. The iterative process further includes determining a similarity vector indicating a similarity of the unbound version of the hypervector with each candidate code hypervector of the concept. Additionally, the iterative process includes generating an estimate of a hypervector representing the concept by a linear combination of the candidate code hypervectors, and weights of the similarity vector.

20 Claims, 9 Drawing Sheets

Representing a data structure by a hypervector using the encoder    601

Determining a granularity of hypervectors so that a hypervector comprises a set of $S$ blocks, each block having size $L$    603

Decomposing the hypervector using the resonator network and similarity vectors    605

(56)                References Cited

U.S. PATENT DOCUMENTS

2023/0206056 A1    6/2023  Hersche et al.
2023/0409871 A1    12/2023  Xu et al.

OTHER PUBLICATIONS

Kleyko, Denis, et al. "A Survey on Hyperdimensional Computing aka Vector Symbolic Architectures, Part I: Models and Data Transformations." arXiv preprint arXiv:2111.06077 (2021). (Year: 2021).*

Pouget, Angeline. "Resonator Networks with Sparse Codes to Reduce Parameters in Deep Neural Networks." ETH Zurich Bachelor's Project. (Year: 2021) (Year: 2021).*

Frady, E. Paxon, et al. "Resonator networks for factoring distributed representations of data structures." arXiv preprint arXiv:2007.03748 (2020). (Year: 2020).*

Kent, Spencer J., et al. "Resonator Networks outperform optimization methods at solving high-dimensional vector factorization." arXiv preprint arXiv:1906.11684 v4 (2020). (Year: 2020).*

Anonymous Authors, "Efficient Codebook And Factorization For Second Order Representation Learning", Under Review as a conference paper at ICLR 2019, 11 Pgs, Accessed May 25, 2022.

Frady et al;, "Resonator Networks for Factoring Distributed Representations of Data Structures", To appear in Neural Computation, 2020, <arXiv:2007.03748v1 [cs.CV] Jul. 7, 2020>, 20 Pgs.

Frady et al;, "Variable Binding for Sparse Distributed Representations: Theory and Applications", ARxIV:2009.06834V1 {cs.NE] Sep. 14, 2020, 16 Pgs.

Frady et al;. "Resonator Networks, 1: An Efficient Solution for Factoring High-Dimensional, Distributed Representations of Data Structures", Neural Computation 32, 2311-2331 (2020) Massachusetts Institute of Technology, 21 Pgs, <https://doi.org/10.1162/neco_a_01331>.

Hersche et al;. "Factorizing Hypervectors", U.S. Appl. No. 17/564,277, filed Dec. 29, 2021, 41 Pgs.

Kent et al;, "Resonator Networks Outperform Optimization Methods at Solving High-Dimensional Vector Factorization", To appear in Neural Computation, 2020, arXiv:1906.11684v4 [cs.NE] Jul. 14, 2020, 61 Pgs.

Kent, Spencer et al;, "Resonator Circuits for Factoring High-Dimensional Vectors", Redwood Center for Theoretical Neuroscience University of California, Berkeley, Aug. 4, 2021, <https://www.arxiv-vanity.com/papers/1906.11684/>, 31 Pgs.

Lallho et al;, "High-Dimensional Computing with Sparse Vectors", Technology Research Center, University of Turku Finland, Access May 26, 2022, 4 Pgs.

Mell et al.; , "The NIST Definition of Cloud Computing", National Institute of Standards and Technology, Special Publication 800-145, Sep. 2011, 7 pages.

Paulino, "Binary Matrix Factorization via Dictionary Learning", Apr. 2018, IEEE Journal of Selected Topics in Signal Processing, 11 Pgs, DOI:10.1109/JSTSP.2018.2875674, <ARxIV:1804/05482v2 [stat.ML] Jul. 26, 2018>.

Poikonen et al;, "High-Dimensional Computing with Sparse Vectors", Conference Paper—Oct. 2015, DOI:10.1109/BioCAS.2015.7348414, 5 Pgs, <https:www.researchgate.net/publication/299535938>.

Rachkovskij et al;, "Binding and Normalization of Binary Sparse Distributed Representations by Context-Dependent Thinning", Draft of Paper Published in: Neural Computation (2001) v. 13 n. 2, pp. 411-452, 32 Pgs.

Rachkovskij, "Representation and Processing of Structures with Binary Sparse Distributed Codes", IEEE Transactions on Knowledge and Data Engineering, vol. 13, No. 2, Mar./Apr. 2001, 16 Pgs.

Reimann, "A novel HD Computing Algebra: Non-associative Superposition of States Creating Sparse Bundles Representing Order Information", Institute of Neuroinformatics University of Zurich and ETH Zurich Switzerland, Feb. 18, 2022, arXiv2202.08633v1 [cs.NE] Feb. 17, 2022, 10 Pgs .<https://arxiv.org/pdf/2202.08633>.

Yang et al;, "A Sparse Singular Value Decomposition Method for High-Dimensional Data", Accepted author version posted on line: Nov. 21, 2013. Published online Oct. 20, 2014, 22 Pgs., <http://www.tandfonline.com/loi/ucgs20>.

Hersche et al;, "Blockwise Factorization of Hypervectors" U.S. Appl. No. 17/809,052, filed Jun. 27, 2022, 46 Pgs.

IBM Appendix P., "List of IBM Patents or Patent Applications to be Treated as Related", Dated Herewith, 2 pages.

* cited by examiner

FIG. 7

BLOCKWISE FACTORIZATION OF HYPERVECTORS

BACKGROUND

The present disclosure relates to the field of digital computer systems, and more specifically, to a resonator network system for factorizing hypervectors blockwise.

Resonator networks may be neural networks that alternate between vector symbolic architecture multiplication operations and pattern completion. Hypervectors may be vectors with a relatively high dimension. Given a determined hypervector formed from an element-wise product of two or more atomic hypervectors (each from a fixed codebook), the resonator network can find the factors of the determined hypervector. The resonator network can iteratively search over the alternatives for each factor individually rather than all possible combinations until a set of factors is found that agrees with the determined hypervector.

SUMMARY

Embodiments are disclosed for a method. The method includes determining a granularity of hypervectors. The method also includes receiving an input hypervector representing a data structure. Additionally, the method includes performing an iterative process to factorize the input hypervector into individual hypervectors representing the cognitive concepts. The iterative process includes, for each concept: determining an unbound version of a hypervector representing the concept by a blockwise unbinding operation between the input hypervector and estimate hypervectors of other concepts. The iterative process further includes determining a similarity vector indicating a similarity of the unbound version of the hypervector with each candidate code hypervector of the concept. Additionally, the iterative process includes generating an estimate of a hypervector representing the concept by a linear combination of the candidate code hypervectors, and weights of the similarity vector.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 is a block diagram of an example hypervector factorizing manager, in accordance with some embodiments of the present disclosure.

Figure 1:
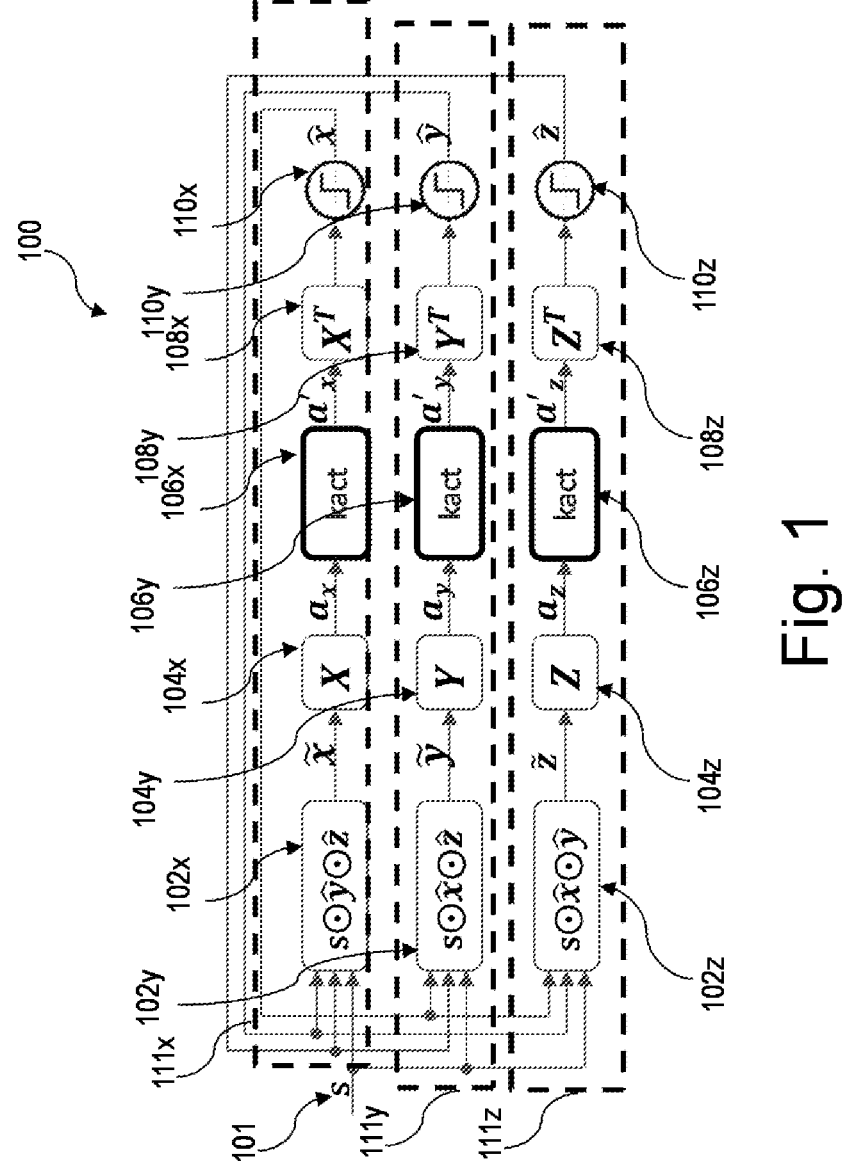
FIG. 1 is a diagram of a resonator network system in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments.

Data structures can represent cognitive concepts, such as colors, shapes, positions, and the like. Each cognitive concept can include items, e.g., items of the color concept can include red, green, blue, and the like. The data structure can contain a combination (e.g., product) of multiple components each representing a cognitive concept. For example, the data structure can be an image of a red disk in the bottom right and a green rectangle in the top left, wherein the cognitive concepts can be the color, shape, and position. In another example, a data structure can form a distributed representation of a tree, wherein each leaf in the tree can represent a concept, and each type of traversal operations in the tree can represent concepts.

The data structure can be encoded by an encoder into a hypervector that uniquely represents the data structure. A hypervector can be a vector of bits, integers, real, or complex numbers. The hypervector is a vector having a dimension higher than a threshold dimension, e.g., 100. The hypervector according to the present subject matter can be a sparse hypervector. The sparse hypervector can include a fraction of non-zeros which is smaller than a predefined threshold fraction (e.g., the threshold fraction can be 10%). The sparsity of the hypervectors can be chosen or can be dictated by the encoder (e.g., such as a neural network). The encoder can combine hypervectors that represent individual concepts with operations in order to represent a data structure. For example, the above mentioned image can be described as a combination of multiplication (or binding) and addition (or superposition) operations as follows: (bottom right*red*disk)+(top left*green*rectangle). The encoder can represent the image using hypervectors that represent the individual concepts and said operations to obtain the representation of the image as a single hypervector that distinctively represents the knowledge that the disk is red and placed at the bottom right and the rectangle is green and placed at the top left. The encoder can be defined by a vector space of a set of hypervectors which encode a set of cognitive concepts and algebraic operations on this set.

The algebraic operations may, for example, include a superposition operation and a binding operation. In addition, the algebraic operations can include a permutation operation. The vector space may, for example, be a D-dimensional space, where D>100. The hypervector can be a D-dimensional vector including D numbers that define the coordinates of a point in the vector space. The D-dimensional hypervectors can be in $\{0,1\}^D$. For example, a hypervector can be understood as a line drawn from the origin to the coordinates specified by the hypervector. The length of the line can be the hypervector's magnitude. The direction of the hypervector can encode the meaning of the representation. The similarity in meaning can be measured by the size of the angles between hypervectors. This can typically be quantified as a dot product between hypervectors. The encoder can be a decomposable (i.e., factored) model to represent the data structures. This can be advantageous as the access to the hypervectors can be decomposed into the primitive or atomic hypervectors that represent the individual items of the concepts in the data structure. For example, the encoder can use a Vector Symbolic Architecture (VSA) technique in order to represent the data structure by a hypervector. The encoder can perform an elementwise multiply operation. The encoder may, for example, include a trained feedforward neural network.

Hence, the encoding of data structures can be based on a predefined set of F concepts, where F>1 and candidate items that belong to each of the F concepts. Each candidate item can be represented by a respective hypervector. Each concept can be represented by a matrix of the hypervectors representing candidate items of the concept, e.g., each column of the matrix can be a distinct hypervector. The matrix can be referred to as codebook and the hypervector representing one item of the concept can be referred to as code hypervector. The components of the code hypervector may, for example, be randomly chosen. For example, a codebook representing the concept of colors can include seven possible colors as candidate items, a codebook representing the concept of shapes can include 26 possible shapes as candidate items etc. The codebooks representing the set of concepts can be referred to as $X_1$, $X_2$ . . . $X_F$ respectively. Each codebook $X_i$ can include $M_{X_i}$ code hypervectors $$x_i^1 \ \ldots \ x_i^{M_{X_i}}, M_{X_i} > 1.$$

Querying such data structures through their hypervector representations can involve decoding the hypervectors. Decoding such hypervectors can be performed by testing every combination of code hypervectors. However, this can be very resource consuming. The present subject matter can solve this issue by using the resonator network. The resonator network can be an iterative approach. In particular, the resonator network can efficiently decode a given hypervector without needing to directly test every combination of factors making use of the fact that the superposition operation is used for the encoding of multiple concept items in the given hypervector and the fact that randomized code hypervectors can be highly likely to be close to orthogonal in the vector space, meaning that they can be superposed without much interference. For that, the resonator network can search for possible factorizations of the given hypervector by combining a strategy of superposition and clean-up memory. The clean-up memory can reduce some crosstalk noise between the superposed concept items. The resonator network combines the strategy of superposition and clean-up memory to efficiently search over the combinatorially large space of possible factorizations.

However, hypervectors can be sparse, meaning that they contain a small fraction of non-zeros. This can render the operations such as binding of hypervectors problematic and thus the factorization may not be accurate. The sparse hypervector can be a hypervector including a fraction of non-zeros which is smaller than a predefined threshold fraction (e.g., the threshold fraction can be 10%). The fraction of non-zeros can be the ratio of the non-zeros and the total number D of elements of the hypervector. The present subject matter can solve this issue by processing the hypervectors at block level rather than at individual element level during the iterative process. For that, the hypervector can be segmented according to the present subject matter into a set of blocks so that a hypervector includes a set of S blocks, each block having a dimension L, wherein D=S×L. S is the number of blocks in a hypervector which can also be the number of non-zeros in the hypervector. Each block of the hypervector can include exclusively one non-zero entry, that is, the hypervector can be segmented into a number of blocks that is equal to the number of non-zero values in the hypervector so that each block can include one non-zero value and remaining values of the block are zero. The iterative process can process blockwise the hypervectors in one or more steps of the iterative process. The blockwise binding and unbinding operations of two hypervectors x and y can be performed using the hypervectors or their offset representations x̌ and y̌ respectively. x̌ and y̌ are S-dimensional vectors, referred to as offset vectors, which are obtained from the respective D-dimensional hypervectors x and y respectively, such that each ith element of the vector x̌ includes an index of the single non-zero value (e.g., "1") within the ith block of the hypervector x. Similarly, each ith element of the vector y̌ includes an index of the single non-zero value (e.g., "1") within the ith block of the hypervector y. For example, the binding operation using the offset representations can be defined as the modulo sum of the indices, which can best be defined in their offset notation as follows: x̌ ⊙ y̌=(x̌+y̌)% L, where ⊙ refers to the binding operation. Similarly, the unbinding operation can be defined as the modulo difference of the indices: x̌ ⊛ y̌=(x̌−y̌)% L, where ⊛ refers to the unbinding operation. The iterative process can stop if a convergence criterion is fulfilled. The convergence criterion may, for example, indicate a predefined number of iterations to be reached.

Assuming for a simplified description of the iterative process of the resonator network that the set of concepts includes three concepts, i.e., F=3. The codebooks/matrices representing the set of concepts can be referred to as X, Y and Z respectively (i.e., X=$X_1$, Y=$X_2$ and Z=$X_3$). The codebook X can include $M_x$ code hypervectors $x^1$ . . . $x^{M_x}$, $M_x$>1. The codebook Y can include $M_y$ code hypervectors $y^1$ . . . $y^{M_y}$, $M_y$>1. The codebook Z can include $M_z$ code hypervectors $z^1$ . . . $z^{M_z}$, $M_z$>1. This can define a search space of size M=$M_x$·$M_y$·$M_z$. Since the resonator network is used, a data structure can be represented by a hypervector s which can be factorized into individual hypervectors representing the set of concepts respectively, i.e., that is, the hypervector s can be defined as follows s=$x^\alpha$ ⊙ $y^\beta$ ⊙ $z^\gamma$. The iterative process can find $x^\alpha$, $y^\beta$, $z^\gamma$ where α∈{1,2, . . . , $M_x$}, β∈{1,2, . . . , $M_y$} and γ∈{1,2, . . . , $M_z$}.

Given the hypervector s that represents the data structure and given the set of predefined concepts, an initialization step can be performed by initializing an estimate of the hypervector that represents each concept of the set of concepts. The initial estimates $\hat{x}(0)$, $\hat{y}(0)$ and $\hat{z}(0)$ may, for example, be defined as a superposition of all candidate code hypervectors of the respective concept, e.g., $\hat{x}(0)=g(\Sigma_{i=1, \ldots, M_x} x^i)$, $\hat{y}(0)=g(\Sigma_{j=1, \ldots, M_y} y^j)$ and $\hat{z}(0)=g(\Sigma_{k=1, \ldots, M_z} z^k)$, where g is a selection function such as an argmax function. The term "estimate of a hypervector u" refers to a hypervector of the same size as hypervector u. The resonator network system can include a first buffer for storing the hypervector s and a second set of buffers for (initially) storing the estimates $\hat{x}(0)$, $\hat{y}(0)$ and $\hat{z}(0)$.

Additionally, for each current iteration t of the iterative process, the following can be performed. Unbound hypervectors $\tilde{x}(t)$, $\tilde{y}(t)$ and $\tilde{z}(t)$ can be computed. Each of the unbound hypervectors can be an estimate of the hypervector that represents the respective concept of the set of concepts. Each of the unbound hypervectors can be inferred from the hypervector s based on the estimates of hypervectors for the other remaining F−1 concepts of the set of concepts. The unbound hypervectors can be computed as follows: $\tilde{x}(t)=s \circledast \hat{y}(t) \circledast \hat{z}(t)$, $\tilde{y}(t)=s \circledast \hat{x}(t) \circledast \hat{z}(t)$ and $\tilde{z}(t)=s \circledast \hat{x}(t) \circledast \hat{y}(t)$, where $\circledast$ refers to unbinding operation. In one example, the unbinding operation can be performed as follows: given hypervectors A, B and C of size D each, the unbinding operation $B=A \circledast C$, can be defined as follows: $B_{(i,q)}:\equiv C_{(i,q+\tau\theta_i(L))}$ where $\tau$ is a parameter with default value 1 and $\theta_i$ is the smallest of the indices of the maxima of block i of the hypervector A, where $$\theta_i = \min\left(\arg\max_q(A_{(i,q)})\right)$$

where '(L)' demotes a modulo L operation and q is an index of the elements within each block. In a second example implementation of the unbinding operation, each of the hypervectors involved in the unbinding operation can be represented by an S-dimensional vector which can be referred to as an offset vector. For example, the offset vectors of the hypervectors s, $\hat{x}(t)$, $\hat{y}(t)$ and $\hat{z}(t)$ can be referred to as $\dot{s}$, $\dot{\hat{x}}(t)$, $\dot{\hat{y}}(t)$ and $\dot{\hat{z}}(t)$ respectively. The ith element of the vector $\dot{s}$, $\dot{x}$, $\dot{y}$ and $\dot{z}$ includes an index of the single non-zero value (e.g., "1") within the ith block of the hypervector s, x, y and z respectively. In this case, the blockwise unbinding can be performed using the modulo difference of the indices per block as follows: $\dot{\tilde{x}}(t)=(\dot{s}-\dot{\hat{y}}(t)-\dot{\hat{z}}(t))\% L$, $\dot{\tilde{y}}(t)=(\dot{s}-\dot{\hat{x}}(t)-\dot{\hat{z}}(t))\% L$ and $\dot{\tilde{z}}(t)=(\dot{s}-\dot{\hat{x}}(t)-\dot{\hat{y}}(t))\% L$, where $\dot{\tilde{x}}(t)$, $\dot{\tilde{y}}(t)$ and $\dot{\tilde{z}}(t)$ are the offset vectors of the unbound hypervectors $\tilde{x}(t)$, $\tilde{y}(t)$ and $\tilde{z}(t)$ respectively. This can be referred to as an inference step. The inference step may, however, be noisy if many estimates (e.g., F−1 is high) are tested simultaneously. The unbound hypervectors $\tilde{x}(t)$, $\tilde{y}(t)$ and $\tilde{z}(t)$ can be noisy. This noise can result from crosstalk of many quasi-orthogonal code hypervectors, and it can be reduced through a clean-up memory. After providing the unbound version of a hypervector of a given concept, the clean-up memory can be used to find the similarity of each code hypervector of said concept to the unbound version of the hypervector. This can be referred to as a similarity step. The similarity can be computed as a dot product of the codebook that represents said concept by the unbound version of the hypervector, resulting in an attention vector $a_x(t)$, $a_y(t)$ and $a_z(t)$ respectively. The attention vector can be referred to herein as a similarity vector. The similarity vectors $a_x(t)$, $a_y(t)$ and $a_z(t)$ have sizes $M_x$, $M_y$ and $M_z$ respectively and can be obtained as follows: $a_x(t)=X^T\tilde{x}(t)\in \mathbb{R}^{M_x}$, $a_y(t)=Y^T\tilde{y}(t)\in \mathbb{R}^{M_y}$ and $a_z(t)$ $=Z^T\tilde{z}(t)\in \mathbb{R}^{M_z}$. For example, the similarity vector $a_x(t)$ can indicate a similarity of the unbound hypervector $\tilde{x}(t)$ with each candidate code hypervector of the concept (X), e.g., the relatively largest element of $a_x(t)$ can indicate the code hypervector which matches best the unbound hypervector $\tilde{x}(t)$. The similarity vector $a_y(t)$ can indicate a similarity of the unbound hypervector $\tilde{y}(t)$ with each candidate code hypervector of the concept (Y), e.g., the relatively largest element of $a_y(t)$ can indicate the code hypervector which matches best the unbound hypervector $\tilde{y}(t)$. The similarity vector $a_z(t)$ can indicate a similarity of the unbound hypervector $\tilde{z}(t)$ with each candidate code hypervector of the concept (Z), e.g., the relatively largest element of $a_z(t)$ indicates the code hypervector which matches best the unbound hypervector $\tilde{z}(t)$.

A weighted superposition (or weighted bundling) using the similarity vectors $a_x(t)$, $a_y(t)$ and $a_z(t)$ as weights can be performed and optionally followed by the application of a selection function g. This can be referred to as the superposition step. This superposition step can be performed using the similarity vectors $a_x(t)$, $a_y(t)$ and $a_z(t)$ as follows: $\hat{x}(t+1)=g(a_x(t)X)$, $\hat{y}(t+1)=g(a_y(t)Y)$ and $\hat{z}(t+1)=g(a_z(t)Z)$ respectively, in order to obtain the current estimates $\hat{x}(t+1)$, $\hat{y}(t+1)$ and $\hat{z}(t+1)$ respectively of the hypervectors that represent the set of concepts. In other words, the superposition step generates each of the estimates $\hat{x}(t+1)$, $\hat{y}(t+1)$ and $\hat{z}(t+1)$ representing the respective concept by a linear combination of the candidate code hypervectors (provided in respective matrices X, Y and Z), with weights given by the respective similarity vectors $a_x(t)$, $a_y(t)$ and $a_z(t)$, and optionally followed by the application of the selection function g. The weights given by the similarity vector are the values of the similarity vector. Hence, the current estimates of the hypervectors representing the set of concepts respectively can be defined as follows $\hat{x}(t+1)=g(XX^T (s \circledast \hat{y}(t) \circledast \hat{z}(t)))$, $\hat{y}(t+1)=g(YY^T (s \circledast \hat{x}(t) \circledast \hat{z}(t)))$ and $\hat{z}(t+1)=g(ZZ^T (s \circledast \hat{x}(t) \circledast \hat{y}(t)))$ where g is the selection function, for example, an argmax function.

The iterative process can stop if a convergence criterion is fulfilled. The convergence criterion may, for example, indicate that the value of at least one element of each similarity vector $a_x(t)$, $a_y(t)$ and $a_z(t)$ exceeds a threshold. In another example, the convergence criterion can indicate that a predefined number of iterations be reached.

According to some embodiments, the similarity step includes sparsifying the similarity vector before the superposition step is performed on the sparsified similarity vector. That is, the similarity vectors $a_x(t)$, $a_y(t)$ and $a_z(t)$ are sparsified in order to obtain the sparsified similarity vectors $a'_x(t)$, $a'_y(t)$ and $a'_z(t)$ respectively. The sparsification of the similarity vector can be performed by activating a portion of the elements of the similarity vector and deactivating the remaining portion of the elements of the similarity vector. Activating an element of the similarity vector means that the element can be used or considered when an operation is performed on the similarity vector. Deactivating an element of the similarity vector means that the element may not be used or considered when an operation is performed on the similarity vector. For example, $a'_x(t)=kact(a_x(t))$, $a'_y(t)=kact(a_y(t))$ and $a'_z(t)=kact(a_z(t))$, where kact is an activation function. In this case, the superposition step described above can be performed on the sparsified similarity vectors $a'_x(t)$, $a'_y(t)$ and $a'_z(t)$ (instead of the similarity vectors $a_x(t)$, $a_y(t)$ and $a_z(t)$) as follows: $\hat{x}(t+1)=g(Xa'_x(t))$, $\hat{y}(t+1)=g(Ya'_y(t))$ and $\hat{z}(t+1)=g(Za'_z(t))$ respectively, in order to obtain the current estimates $\hat{x}(t+1)$, $\hat{y}(t+1)$ and $\hat{z}(t+1)$ respectively of the hypervectors that represent the set of concepts. In other words, the superposition step generates each of the estimates $\hat{x}(t+1)$, $\hat{y}(t+1)$ and $\hat{z}(t+1)$ representing the respective concept by a linear combination of the candidate code hypervectors (provided in respective matrices X, Y and Z), with weights given by the respective sparsified similarity vectors $a'_x(t)$, $a'_y(t)$ and $a'_z(t)$, followed by the application of the selection function g. The weights given by the sparsified similarity vector are the values of the sparsified similarity vector. Hence, the current estimates of the hypervectors representing the set of concepts respectively can be defined as follows $\hat{x}(t+1)=g(Xkact(X^T (s \circledast \hat{y}(t) \circledast \hat{z}(t))))$, $\hat{y}(t+1)=g(Ykact(Y^T (s \circledast \hat{x}(t) \circledast \hat{z}(t))))$ and $\hat{z}(t+1)=g(Zkact(Z^T (s \circledast \hat{x}(t) \circledast \hat{y}(t))))$.

Accordingly, some embodiments of the present disclosure can be advantageous because the sparsification can result in doing only a part of vector multiplication-addition operations instead of all $M_x$, $M_y$ or $M_z$ operations and thus can save processing resources.

In some embodiments, the activation function kact can only activate the top j values in each of the similarity vectors $a_x(t)$, $a_y(t)$ and $a_z(t)$, where $j << M_x$, $j << M_y$ and $j << M_z$ respectively, and deactivate the rest of elements by setting them to a given value (e.g., zero) to produce $a'_x(t)$, $a'_y(t)$ and $a'_z(t)$ respectively. The top j values of a similarity vector can be obtained by sorting the values of the similarity vector and selecting the j first ranked values. j may, for example, be a configurable parameter whose value can change, e.g., depending on available resources.

Accordingly, some embodiments of the present disclosure can be advantageous because the sparsification can reduce the amount of computations, increase the size of solvable problems by an order of magnitude at a fixed vector dimension, and improve the robustness against noisy input vectors.

In some embodiments, the activation function kact can activate each element in each of the of the similarity vectors $a_x(t)$, $a_y(t)$ and $a_z(t)$ only if its absolute value is larger than a mean of all elements of the respective similarity vector. The mean is determined using the absolute values of the similarity vector.

Accordingly, some embodiments of the present disclosure can be advantageous because the sparsification can improve the computational complexity of the first embodiment by removing the sort operation needed to find the top-j elements.

In some embodiments, the activation function kact can be implemented as follows: in case the maximum value of the sparsified similarity vector exceeds a predefined threshold, the maximum value can be maintained and remaining elements of the sparsified similarity vector can be set to zero. This can be referred to as a pullup activation.

In some embodiments, the superposition step includes: mapping the input vector to a S-dimensional vector. The input vector can be the similarity vector ($a_x(t)$, $a_y(t)$, $a_z(t)$) or the sparsified similarity vector ($a'_x(t)$, $a'_y(t)$, $a'_z(t)$) depending on whether the specification is used. The S-dimensional vector has a dimension S which is the number of blocks per hypervector. Each element of the S-dimensional vector indicates one candidate code hypervector of the codebook of the concept (X, Y, Z). A hypervector (Hx, Hy, Hz) can be built such that the ith block of the built hypervector is the ith block of the code hypervector indicated in the ith element of the S-dimensional vector. The estimate hypervectors for the next iteration can be defined as follows: $\hat{x}(t+1)=Hx$, $\hat{y}(t+1)=Hy$ and $\hat{z}(t+1)=Hz$. Accordingly, some embodiments can perform the superposition step blockwise. By contrast to the previous described embodiments, the selection function may not be needed here due to the blockwise processing performed in some embodiments.

In some embodiments, the S-dimensional vector $s_k$ (where k is an index referring to one of the concepts, k=x, y or z) is defined as follows: for every $i^{th}$ element of the S-dimensional vector, a value v can be generated, and the $i^{th}$ element of the S-dimensional vector can be obtained using the following mapping function:

$$\begin{cases} 0 \text{ if } v \le \partial_0 \\ \ldots \\ m \text{ if } \partial_{m-1} < v \le \partial_m \end{cases}$$

where v is a randomly generated value or a deterministic value defined as v=i/S, where $\partial=$cumsum$(a_k)$/sum$(a_k)$ is a step function, where $a_k$ is the similarity vector $a_x(t)$, $a_y(t)$ or $a_z(t)$ or the sparsified similarity vector $a'_x(t)$, $a'_y(t)$ or $a'_z(t)$ if the sparsification is used. $\partial_m$ refers to the $m^{th}$ element of $\partial$. The function cumsum(A) returns a vector containing the cumulative sum of the elements of A. sum(A) returns the sum of elements of vector A. The mapping function can map each element of the S-dimensional vector $s_k$ to a given value based on the location of the generated value v within the vector $\partial$ as defined above. In one example, the S-dimensional vector can be shuffled before being used to build the respective hypervector Hx, Hy or Hz.

The present subject matter can efficiently factorize the hypervector representing a data structure into the primitives from which it is composed. For example, given a hypervector formed from an element-wise product of two or more hypervectors, its factors (i.e., the two or more hypervectors) can be efficiently found. This way, a nearest-neighbor lookup can need only search over the alternatives for each factor individually rather than all possible combinations. This can reduce the number of operations involved in every iteration of the resonator network and hence reduce the complexity of execution. This can also solve larger size problems (at fixed dimensions), and improve the robustness against noisy input hypervectors.

FIG. 1 is a diagram illustrating a resonator network system 100 in accordance with an example of the present subject matter.

The resonator network system 100 can be configured to execute a resonator network to decode hypervectors that are encoded in a vector space defined by three concepts. The codebooks representing the set of concepts can be referred to as X, Y and Z respectively. The codebook X can include $M_x$ code hypervectors $x^1 \ldots x^{M_x}$, $M_x > 1$. The codebook Y can include $M_y$ code hypervectors $y^1 \ldots y^{M_y}$, $M_y > 1$. The codebook Z can include $M_z$ code hypervectors $z^1 \ldots z^{M_z}$, $M_z > 1$. This can define a search space of size $M=M_x \cdot M_y \cdot M_z$. The resonator network may, for example, be a recurrent neural network. The resonator network system 100 can include network nodes 102x, 102y and 102z that represent respectively the three concepts. The resonator network system 100 can further include memories 104x, 104y and 104z for storing the codebooks X, Y and Z respectively. The resonator network system 100 can further include computation units 108x, 108y and 108z including respectively memories for storing the transposes $X^T$, $Y^T$ and $Z^T$ of the codebooks respectively. The resonator network system 100 can further include activation units 106x, 106y and 106z for each of the three concepts respectively. The activation units 106x, 106y and 106z may, for example, implement the activation function kact according to the present subject matter. The resonator network system 100 can further include selection units 110*x*, 110*y* and 110*z* for each of the three concepts. The selection units 110*x*, 110*y* and 110*z* may, for example, implement a selection function such as an argmax function. As indicated in FIG. 1, the concepts of the vector space can be associated with processing lines 111*x*, 111*y* and 111*z* respectively, wherein each processing line can provide an estimate of a hypervector representing the respective concept, e.g., the processing line 111*x* provides estimates $\hat{x}$, the processing line 111*y* provides estimates $\hat{y}$ and the processing line 111*z* provides estimates $\hat{z}$.

An input hypervector 101 named s can be received by the resonator network system 100. The input hypervector s can be the result of encoding a data structure such as a colored image including MNIST digits. The encoding can be performed by a VSA technique. At an initial state t=0 the resonator network system 100 can initialize an estimate of the hypervector that represents each concept of the set of concepts as a superposition of all candidate code hypervectors of said concept as follows: $\hat{x}(0)=g(\Sigma_{i=1, \ldots, M_x} x^i)$, $\hat{y}(0)=g(\Sigma_{j=1, \ldots, M_y} y^j)$ and $\hat{z}(0)=g(\Sigma_{k=1, \ldots, M_z} z^k)$ where g is the selection function.

The operation of the resonator network system 100 can be described for a current iteration t. The network nodes 102*x*, 102*y* and 102*z* can receive simultaneously or substantially simultaneously the respective triplet (s, $\hat{y}$(t), $\hat{z}$(t)), (s, $\hat{x}$(t), $\hat{z}$(t)) and (s, $\hat{x}$(t), $\hat{y}$(t)). The three network nodes can compute the unbound versions $\tilde{x}$(t), $\tilde{y}$(t) and $\tilde{z}$(t) of the hypervectors that represent the set of concepts respectively as follows: $\tilde{x}(t)=s \circledast \hat{y}(t) \circledast \hat{z}(t)$, $\tilde{y}(t)=s \circledast \hat{x}(t) \circledast \hat{z}(t)$ and $\hat{z}(t)=s \circledast \hat{x}(t) \circledast \hat{y}(t)$, where $\circledast$ refers to blockwise unbinding. This can be referred to as an inference step. That is, the nodes can perform the inference step on respective input triplets. The blockwise unbinding may, for example, be performed using the modulo difference of the indices per block as follows: $\tilde{x}(t)=(\dot{s}-\hat{y}(t)-\hat{z}(t))\% \ L$, $\tilde{y}(t)=(\dot{s}-\hat{x}(t)-\hat{z}(t))\% \ L$ and $\tilde{z}(t)=(\dot{s}-\hat{x}(t)-\hat{y}(t))\% \ L$.

The similarity of the unbound version $\tilde{x}$(t) with each of the $M_x$ code hypervectors $x^1 \ldots x^{M_x}$ can be computed using the codebook X stored in memory 104*x* as follows: $a_x(t)=X^T\tilde{x}(t) \in \mathbb{R}^{M_x}$ for multiplying the hypervector $\tilde{x}$(t) by the matrix $X^T$. The similarity of the unbound version $\tilde{y}$(t) with each of the $M_y$ code hypervectors $y^1 \ldots y^{M_y}$ can be computed using the codebook Y stored in memory 104*y* as follows: $a_y(t)=Y^T\tilde{y}(t) \in \mathbb{R}^{M_y}$ for multiplying the hypervector $\tilde{y}$(t) by the matrix $Y^T$. The similarity of the unbound version $\tilde{z}$(t) with each of the $M_z$ code hypervectors $z^1 \ldots z^{M_z}$ can be computed using the codebook Z stored in memory 104*z* as follows: $a_z(t)=Z^T\tilde{z}(t) \in \mathbb{R}^{M_z}$ for multiplying the hypervector $\tilde{z}$(t) by the matrix $Z^T$. The resulting vectors $a_x(t)$, $a_y(t)$ and $a_z(t)$ can be named similarity vectors or attention vectors. The relatively largest element of each of the similarity vectors $a_x(t)$, $a_y(t)$ and $a_z(t)$ indicates the code hypervector which matches best the unbound version $\tilde{x}$(t), $\tilde{y}$(t) and $\tilde{z}$(t) respectively.

After computing the similarity vectors, the similarity vectors $a_x(t)$, $a_y(t)$ and $a_z(t)$ can optionally be sparsified using the activation function kact implemented by the activation units 106*x*, 106*y* and 106*z* respectively. The sparsification of the similarity vector can be performed by activating a portion of the elements of the similarity vector. For that, the activation function kact can be used to activate said portion of elements as follows: $a'_x(t)=kact(a_x(t))$, $a'_y(t)=kact(a_y(t))$ and $a'_z(t)=kact(a_z(t))$. The modified/sparsified similarity vectors $a'_x(t)$, $a'_y(t)$ and $a'_z(t)$ can be the output of the similarity step. Thus, for each concept of the set of concepts, the similarity step can receive as input the respective one of the unbound versions $\tilde{x}$(t), $\tilde{y}$(t) and $\tilde{z}$(t) and provide as output the respective one of the modified similarity vectors $a'_x(t)$, $a'_y(t)$ and $a'_z(t)$.

After obtaining the modified similarity vectors $a'_x(t)$, $a'_y(t)$ and $a'_z(t)$, a superposition step can be applied on the modified similarity vectors $a'_x(t)$, $a'_y(t)$ and $a'_z(t)$. In case the sparsification is not performed, the superposition step can be performed on the similarity vectors $a_x(t)$, $a_y(t)$ and $a_z(t)$.

In one first example implementation of the superposition step, a weighted superposition of the modified similarity vectors $a'_x(t)$, $a'_y(t)$ and $a'_z(t)$ can be performed using the codebooks $X^T$, $Y^T$ and $Z^T$ stored in memories 108*x*, 108*y*, and 108*z* respectively. This can be performed by the following matrix vector multiplications: $Xa'_x(t)$, $Ya'_y(t)$ and $Za'_z(t)$. The resulting hypervectors $Xa'_x(t))$, $Ya'_y(t))$ and $Za'_z(t)$ can be fed to the selection units 110*x*, 110*y* and 110*z* respectively. This can make it possible to obtain the estimate of the hypervectors $\hat{x}$(t+1), $\hat{y}$(t+1) and $\hat{z}$(t+1) respectively for the next iteration t+1 as follows: $\hat{x}(t+1)=g(Xa'_x(t))$, $\hat{y}(t+1)=g(Ya'_y(t))$ and $\hat{z}(t+1)=g(Za'_z(t))$. This can enable the superposition step of the iterative process. For each concept of the concepts the superposition step can receive as input the respective one of the modified similarity vectors $a'_x(t)$, $a'_y(t)$ and $a'_z(t)$ and provides as an output the respective one of the hypervectors $\hat{x}$(t+1), $\hat{y}$(t+1) and $\hat{z}$(t+1). Hence, the estimate of the hypervectors representing the set of concepts respectively can be defined according to the present system as follows $\hat{x}(t+1)=g(Xkact(X^T(s \odot \hat{y}(t) \odot \hat{z}(t))))$, $\hat{y}(t+1)=g(Ykact(Y^T(s \odot \hat{x}(t) \odot \hat{z}(t))))$ and $\hat{z}(t+1)=g(Zkact(Z^T(s \odot \hat{x}(t) \odot \hat{y}(t))))$ where g is the selection function.

In one second example implementation of the superposition step, each of the modified similarity vectors $a'_x(t)$, $a'_y(t)$ and $a'_z(t)$ can be mapped to a S-dimensional vector $s_x(t)$, $s_y(t)$ and $s_z(t)$ respectively, where S is the number of blocks per hypervector. Each element of the S-dimensional vector $s_x(t)$ indicates one candidate code hypervector of the codebook of the concept X. Each element of the S-dimensional vector $s_y(t)$ indicates one candidate code hypervector of the codebook of the concept Y. Each element of the S-dimensional vector $s_z(t)$ indicates one candidate code hypervector of the codebook of the concept Z. For each concept, a hypervector can be built such that the ith block of the built hypervector is the ith block of the code hypervector indicated in the ith element of the respective S-dimensional vector. For example, hypervectors Hx, Hy and Hz can be built from the S-dimensional vectors $s_x(t)$, $s_y(t)$ and $s_z(t)$ respectively. The estimate of the hypervectors $\hat{x}$(t+1), $\hat{y}$(t+1) and $\hat{z}$(t+1) can be defined respectively for the next iteration t+1 as follows: $\hat{x}(t+1)=Hx$, $\hat{y}(t+1)=Hy$ and $\hat{z}(t+1)=Hz$ respectively, The hypervector Hx can be built as follows. A step function $t_x$ can be defined from the modified similarity vectors $a'_x(t)$ as follows: $t_x=cumsum(a'_x(t))/sum(a'_x(t))$. A mapping function can be used to define elements of the vector $s_x(t)$ as follows $$s_x(i) = \begin{cases} 0 \text{ if } v \le t_{x_0} \\ \ldots \\ m \text{ if } t_{x_{m-1}} < v \le t_{x_m} \end{cases}$$

follows where v is a randomly generated value or a deterministic value defined as v=i/S. $t_{x_m}$ refers to the $m^{th}$ element of $t_x$. The ith block of the hypervector Hx can be the ith block of the $l^{th}$ code hypervector of the codebook X, where $l=s_x(i)$.

The hypervector Hy can be built as follows. A step function $t_y$ can be defined from the modified similarity vectors $a'_y(t)$ as follows: $t_y=\text{cumsum}(a'_y(t))/\text{sum}(a'_y(t))$. A mapping function can be used to define elements of the vector $s_y(t)$ as follows $$s_y(i) = \begin{cases} 0 \text{ if } v \le t_{y_0} \\ \dots \\ m \text{ if } t_{y_{m-1}} < v \le t_{y_m} \end{cases}$$

where v is a randomly generated value or a deterministic value defined as $v=i/S$. $t_{y_m}$ refers to the $m^{th}$ element of $t_y$. The ith block of the hypervector Hy can be the ith block of the $l^{th}$ code hypervector of the codebook Y, where $l=s_y(i)$.

The hypervector Hz can be built as follows. A step function $t_z$ can be defined from the modified similarity vectors $a'_z(t)$ as follows: $t_z=\text{cumsum}(a'_z(t))/\text{sum}(a'_z(t))$. A mapping function can be used to define elements of the vector $s_z(t)$ as follows $s_z(i)=$ $$\begin{cases} 0 \text{ if } v \le t_{z_0} \\ \dots \\ m \text{ if } t_{z_{m-1}} < v \le t_{z_m} \end{cases}$$

where v is a randomly generated value or a deterministic value defined as $v=i/S$. $t_{z_m}$ refers to the $m^{th}$ element of $t_z$. The ith block of the hypervector Hz can be the ith block of the $l^{th}$ code hypervector of the codebook Z, where $l=s_z(i)$.

The iterative process can stop if a stopping criterion is fulfilled. The stopping criterion may, for example, indicate that $\hat{x}(t+1)=\hat{x}(t)$, $\hat{y}(t+1)=\hat{y}(t)$ and $\hat{z}(t+1)=\hat{z}(t)$ or that a threshold number of iterations is reached.

Figure 2:
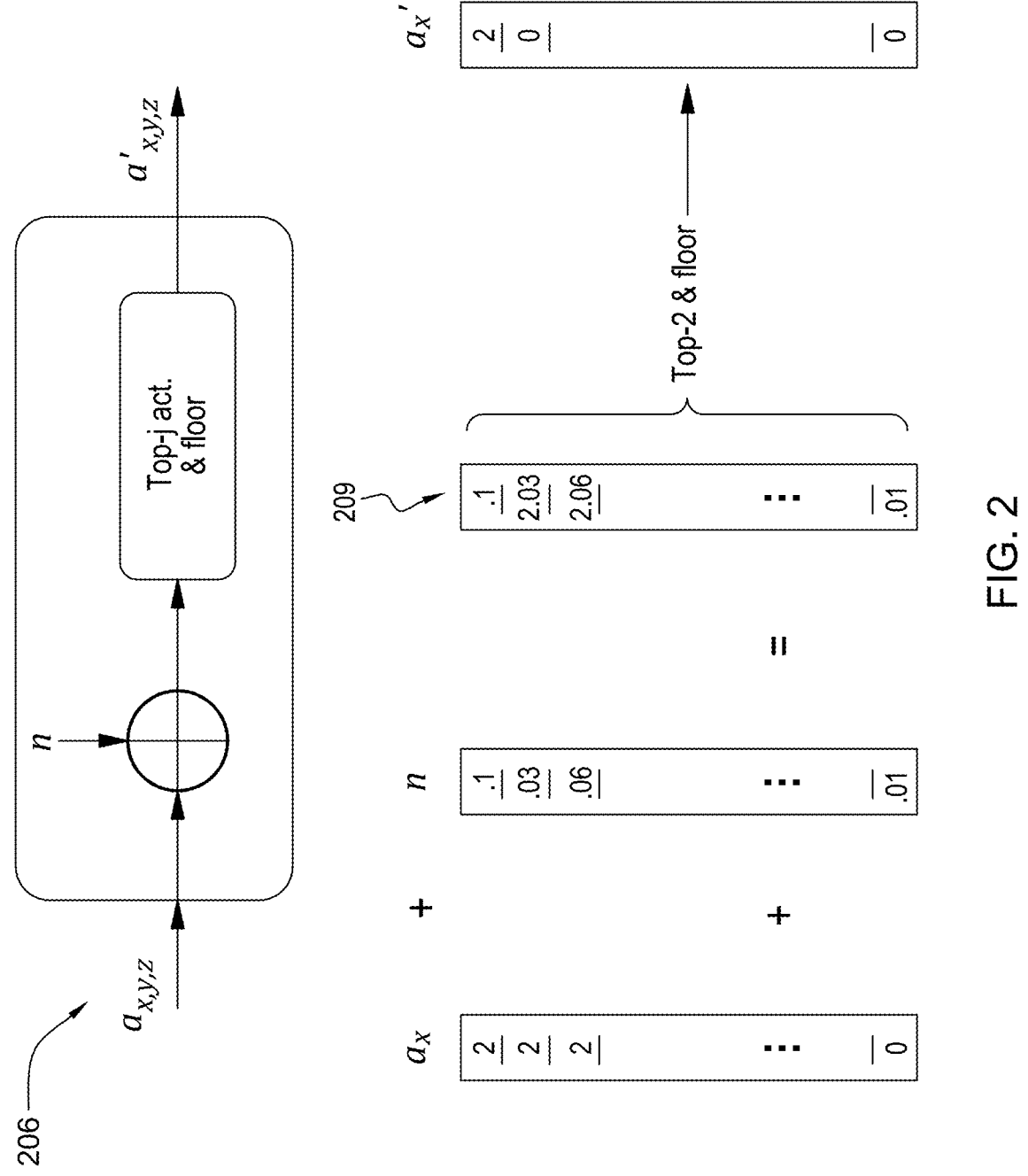
FIG. 2 is a diagram of an activation unit in accordance with some embodiments of the present disclosure.

FIG. 2 is a diagram illustrating an activation unit 206 in accordance with an example of the present subject matter. The activation unit 206 provides an example implementation of each of the activation units 106x, 106y and 106z of FIG. 1.

The activation unit 206 can be configured to receive the similarity vector vectors $a_x(t)$, $a_y(t)$ or $a_z(t)$ and provide as output the sparsified similarity vectors $a'_x(t)$, $a'_y(t)$ and $a'_z(t)$ respectively. For that, a noise vector n can be added to the input similarity vector, resulting in a noised vector. The values in the noise vector n can be drawn from an i.i.d. uniform distribution $\mathcal{U}(0,1)$. Such additive noise can be present in the readout noise when computing the overlap with an analog device, e.g., a phase-change memory. The top j elements of the noised vector can be activated, and remaining elements can be deactivated. For example, the top-j activation passes the top j values of the noised vector and sets the remaining values of the noised vector to zero. For example, a standard sorting algorithm sorts multiple indices with same values deterministically, opting for the first or last index, depending on the implementation. This can randomize the top-j selection by adding a random vector n to the attention vector. A floored version of the resulting vector can be derived to obtain the sparsified similarity vectors $a'_x(t)$, $a'_y(t)$ or $a'_z(t)$.

FIG. 2 shows an example of a randomized top-2 activation. As shown in FIG. 2, a noise vector n is added to the similarity vector $a_x$. This results in a noised vector 209 of the same size as the noise vector n and the similarity vector $a_x$. The top two elements of the noised vector 209 can be selected. As illustrated in FIG. 2, the top two elements of the noised vector 209 are the first and third elements having values 2.1 and 2.06 respectively. The remaining elements which are not the first or third elements of the noised vector 209 are set to zero. In addition, a floored version of the (non-zero) activated elements 2.1 and 2.06 can be performed. This can result in the same value 2 for the first and third elements in the sparsified similarity vector $a'_x$.

Figure 3:
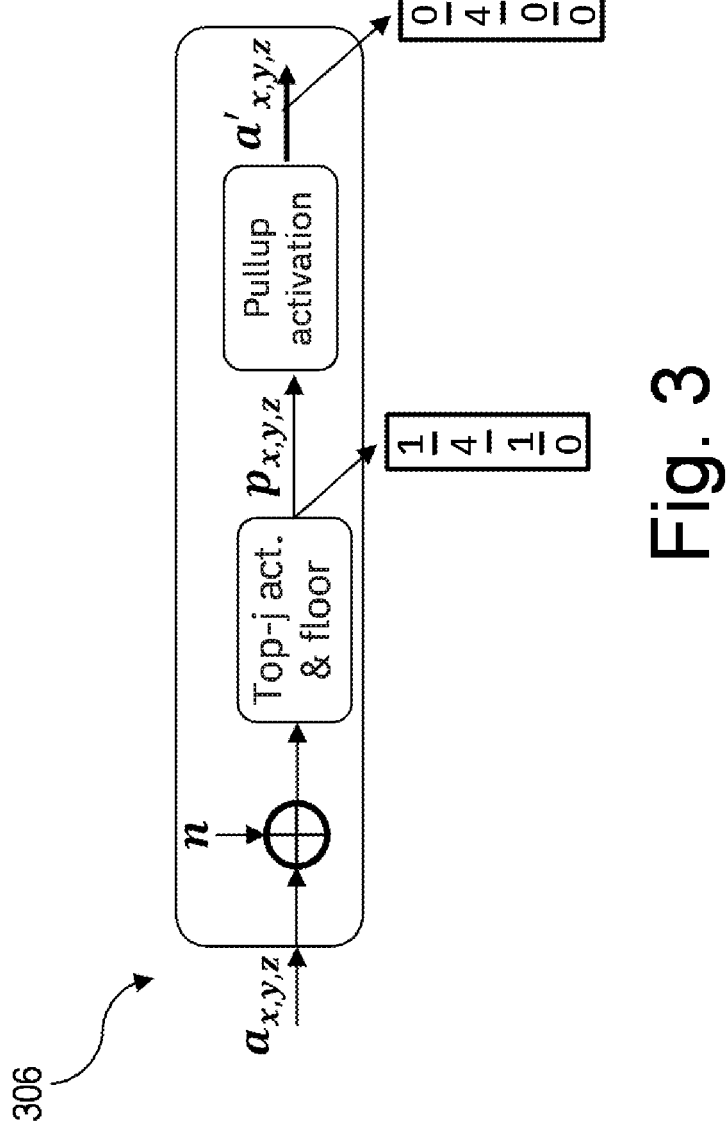
FIG. 3 is a diagram of an activation unit in accordance with some embodiments of the present disclosure.

FIG. 3 is a diagram illustrating an activation unit 306 in accordance with an example of the present subject matter. The activation unit 306 provides an example implementation of each of the activation units 106x, 106y and 106z of FIG. 1.

The activation unit 306 can be configured to receive the similarity vector vectors $a_x(t)$, $a_y(t)$ or $a_z(t)$ and provide as output the sparsified similarity vectors $a'_x(t)$, $a'_y(t)$ and $a'_z(t)$ respectively. For that, a noise vector n can be added to the input similarity vector, resulting in a noised vector. The values in the noise vector n can be drawn from a uniform distribution $\mathcal{U}(0,1)$, for example. Such additive noise can be present in the readout noise when computing the overlap with an analog device, e.g., a phase-change memory. The top j elements of the noised vector can be activated, and the remaining elements can be deactivated. For example, the top-j activation passes the top-j values of the noised vector and sets the remaining values of the noised vector to zero. For example, a standard sorting algorithm sorts multiple indices with same values deterministically, opting for the first or last index, depending on the implementation. This can randomize the top-j selection by adding a random vector n to the attention vector. A floored version of the resulting vector can be derived to obtain the non-pullup vectors $p_x(t)$, $p_y(t)$ or $p_z(t)$. A threshold-based pullup activation can be performed on the non-pullup vectors $p_x(t)$, $p_y(t)$ or $p_z(t)$ in order to obtain the sparsified similarity vectors $a'_x(t)$, $a'_y(t)$ or $a'_z(t)$ respectively. If a maximizing value exceeds the pullup threshold, all remaining values are set to zero. The pullup threshold can be a hyperparameter. FIG. 3 shows an example of a non-pullup vector which has four values 1, 4, 1 and 0. Applying the threshold-based pullup activation on these four values can keep the second element which has value 4 that exceeds the threshold, and the remaining elements are set to zero.

Figure 4:
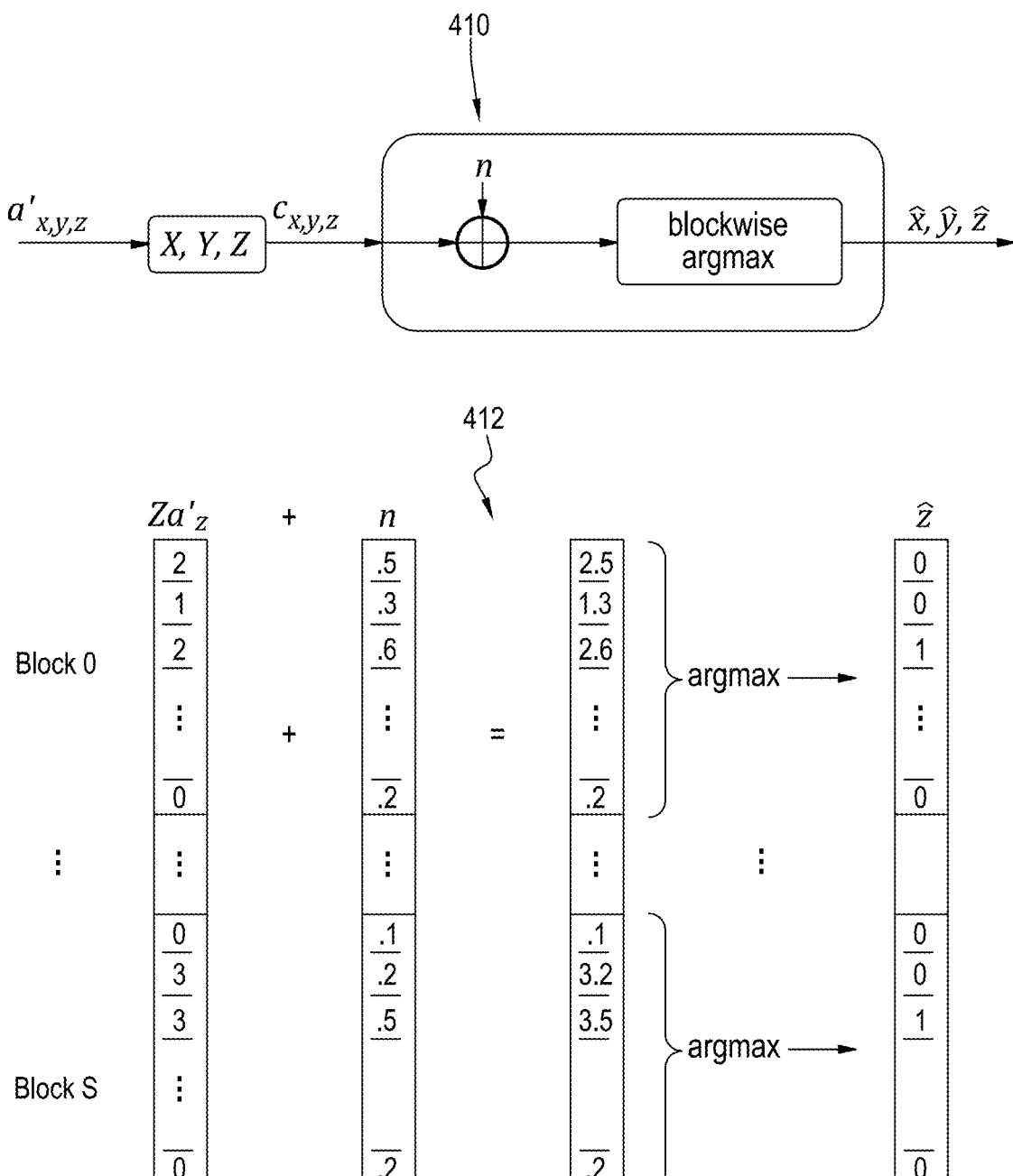
FIG. 4 is a diagram of a selection unit in accordance with some embodiments of the present disclosure.

FIG. 4 is a diagram illustrating a selection unit 410 in accordance with an example of the present subject matter. The selection unit 410 provides an example implementation of each of the selection units 110x, 110y and 110z of FIG. 1.

The selection unit 410 can be configured to receive the hypervectors $c_x(t)$, $c_y(t)$ or $c_z(t)$ and provide as output the estimate of the hypervectors $\hat{x}(t+1)$, $\hat{y}(t+1)$ and $\hat{z}(t+1)$ respectively for the next iteration t+1. The hypervectors $c_x(t)$, $c_y(t)$ or $c_z(t)$ can be defined by matrix vector multiplications $Xa'_x(t)$, $Ya'_y(t)$ and $Za'_z(t)$ respectively. The selection unit 410 can add a noise hypervector n to the input hypervector, resulting in a noised hypervector. The values in the noise hypervector n can be drawn from an i.i.d. uniform distribution $\mathcal{U}(0,1)$. A blockwise argmax can be applied on the noised hypervector by setting the maximizing element of each block to logical one and the rest to logical zero in order to obtain the estimate of the hypervectors $\hat{x}(t+1)$, $\hat{y}(t+1)$ or $\hat{z}(t+1)$. Adding the noise hypervector can randomize the argmax. The selection unit 410 can enable that attention values $a'_x(t)$, $a'_y(t)$ and $a'_z(t)$ are multiplied to the sparse codebook vectors and the scaled vectors are added together (e.g., weighted superposition) while maintaining a logical one per block.

FIG. 4 shows an example implementation of the selection function. As shown in FIG. 4, a noise hypervector n is added to the hypervector $c_z(t)=Za'_z(t)$. Each of the hypervectors has a number S of blocks. This results in a noised hypervector 412 of the same size as the noise hypervector n and the hypervector $c_z(t)$. The selection function argmax can be applied on each block of the S blocks of the noised hypervector 412 so that the element having the highest value in the block is maintained and the remaining elements are set to zero. This can result in the hypervector $\hat{z}(t+1)$. For example, the first block of the noised hypervector 412 has maximum value of 2.6 in the third element of the first block. Thus, the third element of the first block is maintained by setting its value to one and the remaining elements of the first block are set to zero in the hypervector $\hat{z}(t+1)$.

Figure 5:
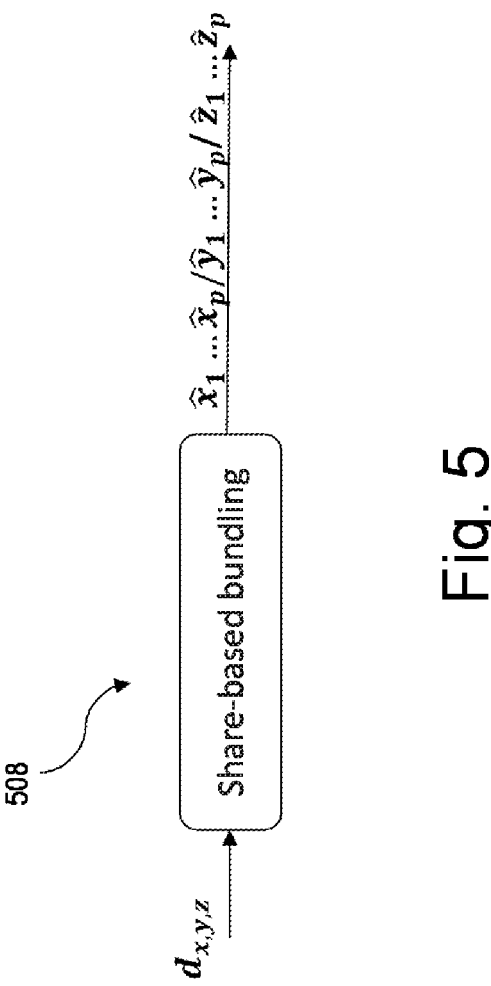
FIG. 5 is a diagram of a computation unit in accordance with some embodiments of the present disclosure.

FIG. 5 is a diagram illustrating a computation unit 508 in accordance with an example of the present subject matter. The computation unit 508 provides an example implementation of each of the computation units 108$x$, 108$y$ and 108$z$ of FIG. 1.

The computation unit 508 can be configured to receive, in one first use case, the similarity vector $a_x(t)$, $a_y(t)$ or $a_z(t)$ and provide as output a set of p hypervectors $\hat{x}_1(t+1) \ldots \hat{x}_p(t+1)$, $\hat{y}_1(t+1) \ldots \hat{y}_p(t+1)$ and $\hat{z}(t+1) \ldots \hat{z}_p(t+1)$ respectively. In case the sparsification is used according to a second use case, the computation unit 508 can be configured to receive the sparsified similarity vector $a'_x(t)$, $a'_y(t)$ or $a'_z(t)$ and provide as output a set of p hypervectors $\hat{x}_1(t+1) \ldots \hat{x}_p(t+1)$, $\hat{y}_1(t+1) \ldots \hat{y}_p(t+1)$ and $\hat{z}_1(t+1) \ldots \hat{z}_p(t+1)$ respectively. The sparsified similarity vectors $a'_x(t)$, $a'_y(t)$ and $a'_z(t)$ can be obtained, for example, by the activation units 106$x$, 106$y$, 106$z$ from input similarity vectors $a_x(t)$, $a_y(t)$ and $a_z(t)$ respectively. Thus, the computation unit 508 can be configured to receive the vector $d_x(t)$, $d_y(t)$ or $d_z(t)$ and provide as output a set of p hypervectors $\hat{x}_1(t+1) \ldots \hat{x}_p(t+1)$, $\hat{y}_1(t+1) \ldots \hat{y}_p(t+1)$ and $\hat{z}_1(t+1) \ldots \hat{z}_p(t+1)$ respectively, where $d_x(t)=a_x(t)$, $d_y(t)=a_y(t)$ and $d_z(t)=a_z(t)$, or $d_x(t)=a'_x(t)$, $d_y(t)=a'_y(t)$ and $d_z(t)=a'_z(t)$.

The set of p hypervectors $\hat{x}_1(t+1) \ldots \hat{x}_p(t+1)$ may, for example, be provided as follows. Using the received vector $d_x(t)$, the computation unit 508 can perform a number of p times the second example implementation of the superposition step that uses the mapping function in order to generate p hypervectors $\hat{x}_1(t+1) \ldots \hat{x}_p(t+1)$. For example, a different value v of the mapping function can be used for each generated hypervector of the p hypervectors. Each of the p hypervectors $\hat{x}_1(t+1) \ldots \hat{x}_p(t+1)$ can be processed in the respective processing line 111$x$ in the units 102 and 104 as a normal hypervector resulting in p similarity vectors $a_{x_1}(t+1)$, $a_{x_2}(t+1) \ldots a_{x_p}(t+1)$. These p similarity vectors can be added together to obtain a similarity vector $a_x(t+1)$ before $a_x(t+1)$ is processed in a next iteration by the computation unit 508 or before $a_x(t+1)$ is sparsified to obtain $a'_x(t+1)$, e.g., a vector addition of the p similarity vectors $a_{x_1}(t+1)$, $a_{x_2}(t+1) \ldots a_{x_p}(t+1)$ can be performed to obtain $a_x(t+1)$.

Figure 6:
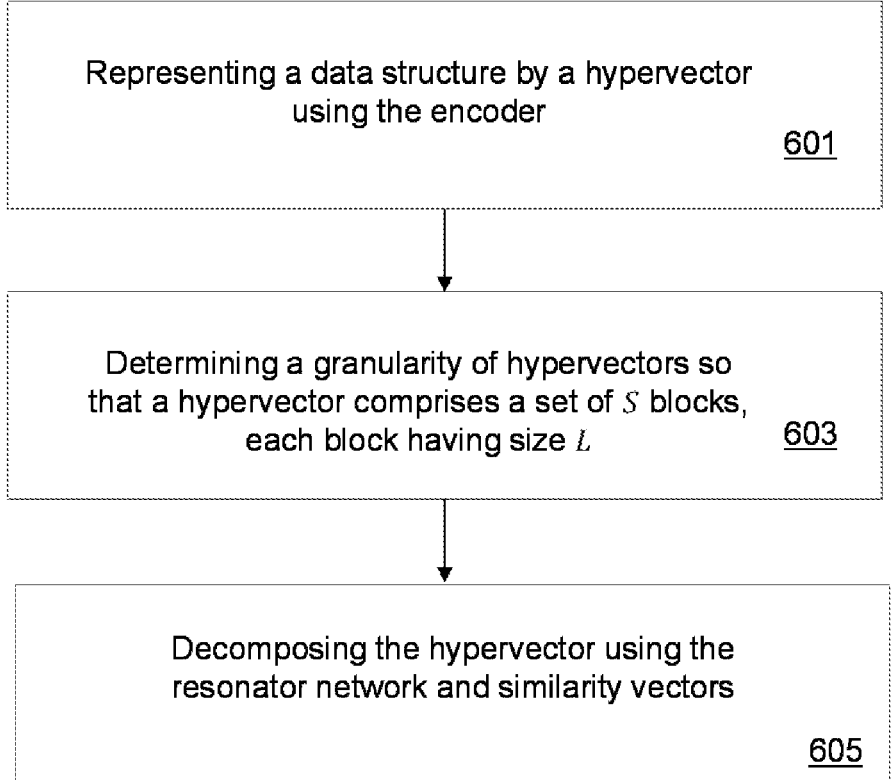
FIG. 6 is a flowchart of a method for factorizing a hypervector in accordance with some embodiments of the present disclosure.

FIG. 6 is a flowchart of a method for factorizing a hypervector in accordance with an example of the present subject matter. The hypervectors can include zero values and non-zero (e.g., one) values.

A data structure can be represented in step 601 by a hypervector, s, using an encoder such as a VSA based encoder. The data structure may, for example, be a query image representing a visual scene. The encoder can be a feed-forward neural network that is trained to produce the hypervector s as a compound hypervector describing the input visual image. The image can include colored MNIST digits. The components of the image can be the color, shape, vertical and horizontal locations of the letters in the image. The encoder may, for example, be configured to compute a hypervector for each letter in the image by multiplying the related quasi-orthogonal hypervectors drawn from four fixed codebooks of four concepts: color codebook (with 7 possible colors), shape codebook (with 26 possible shapes), vertical codebook (with 50 locations), and horizontal codebook (with 50 locations). The product vectors for every letter are added (component-wise) to produce the hypervector s describing the whole image.

A granularity of hypervectors can be determined in step 603 so that a hypervector includes a set of S blocks, each block having size $L \geq 1$, wherein $D=S \times L$. For example, the block size can be higher than one, $L > 1$. In other words, step 603 includes determining for each hypervector a set of S blocks, each block having size L, where $D=S \times L$. For example, the hypervector can be segmented or divided into a number of blocks that is equal to the number of non-zero values (e.g., non-zero value=1) in the hypervector so that each block can include one non-zero value. Each processed hypervector can have the same number S of blocks, but the positions/indices of the non-zero values within blocks can differ between the hypervectors.

The hypervector s can be decomposed in step 605 using the resonator network and the determined blocks. The resonator network is configured to receive the input hypervector s and to perform an iterative process in order to factorize the input hypervector into individual hypervectors representing the set of concepts respectively. The iterative process includes for each concept of the set of concepts: an inference step for computing an unbound version of a hypervector representing the concept by a blockwise unbinding operation between the input hypervector and estimate hypervectors of the other concepts, a similarity step to compute a similarity vector indicating a similarity of the unbound version with each candidate code hypervector of the concept, and a superposition step to generate an estimate of a hypervector representing the concept by a linear combination of the candidate code hypervectors, with weights given by the similarity vector. The iterative process can stop if a convergence criterion is fulfilled. The convergence criterion, for example, can indicate a predefined number of iterations to be reached or the difference between the current estimate of a hypervector representing each concept and the last estimate of a hypervector representing each concept is smaller than a threshold.

Figure 7:
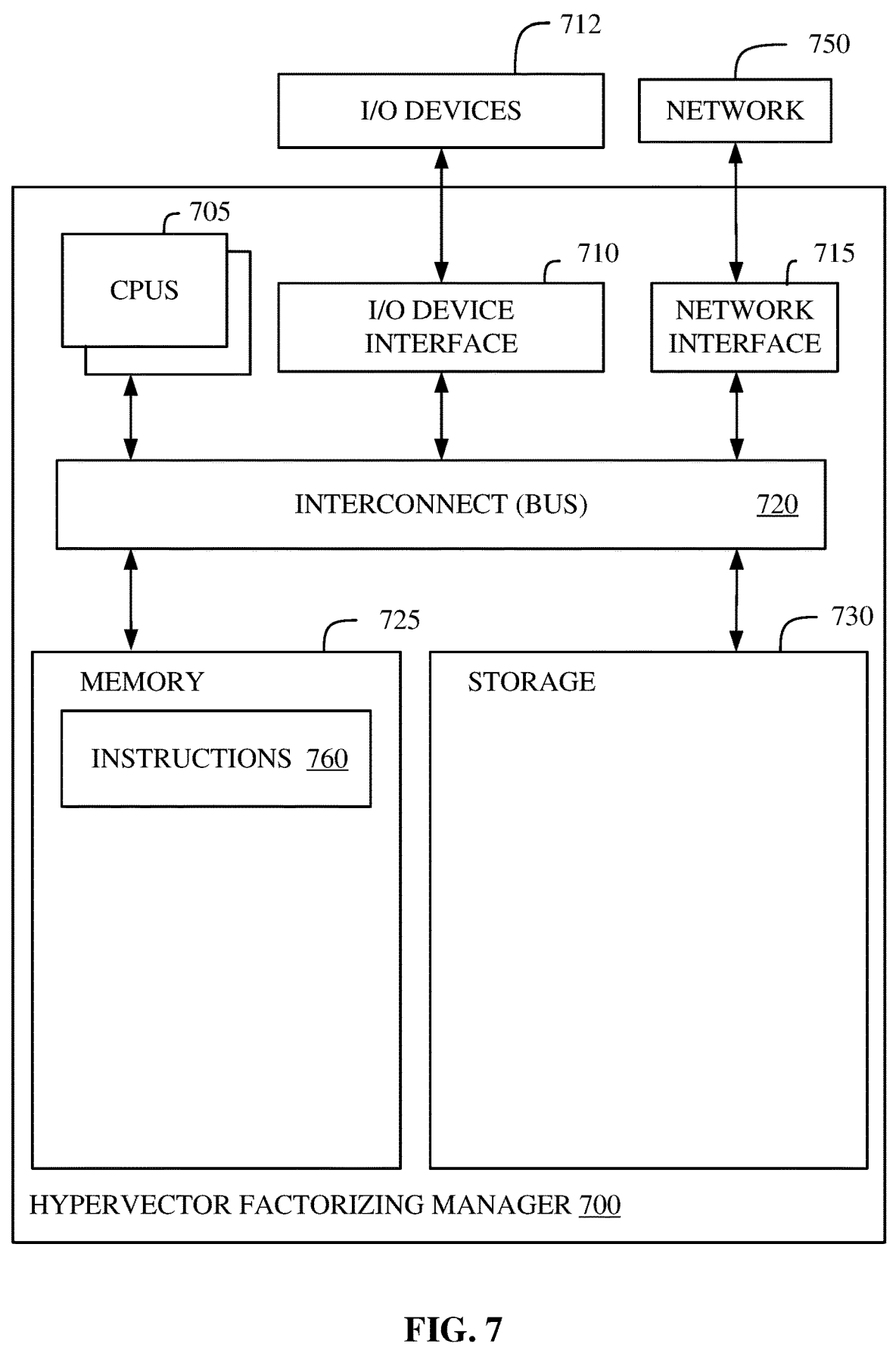

FIG. 7 is a block diagram of an example hypervector factorizing manager 700, in accordance with some embodiments of the present disclosure. In various embodiments, the hypervector factorizing manager 700 is similar to the resonator network 100 and can perform the method described in FIG. 6 and/or the functionality discussed in FIGS. 1-5. In some embodiments, the hypervector factorizing manager 700 provides instructions for the aforementioned methods and/or functionalities to a client machine such that the client machine executes the method, or a portion of the method, based on the instructions provided by the hypervector factorizing manager 700. In some embodiments, the hypervector factorizing manager 700 includes software executing on hardware incorporated into a plurality of devices.

The hypervector factorizing manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 7D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, and/or flash memory devices. Additionally, the storage 730 can include storage area-network (SAN) devices, the cloud, or other devices connected to the hypervector factorizing manager 700 via the I/O device interface 710 or to a network 750 via the network interface 715.

In some embodiments, the memory 725 stores instructions 760. However, in various embodiments, the instructions 760 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all of, the method described in FIG. 6 and/or the functionality discussed in FIGS. 1-5.

In various embodiments, the I/O devices 712 include an interface capable of presenting information and receiving input. For example, I/O devices 712 can present information to a listener interacting with hypervector factorizing manager 700 and receive input from the listener.

The hypervector factorizing manager 700 is connected to the network 750 via the network interface 715. Network 750 can include a physical, wireless, cellular, or different network.

In some embodiments, the hypervector factorizing manager 700 can be a multi-user mainframe computer system, a single-user system, or a server computer or similar device that has little or no direct user interface but receives requests from other computer systems (clients). Further, in some embodiments, the hypervector factorizing manager 700 can be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary hypervector factorizing manager 700. In some embodiments, however, individual components can have greater or lesser complexity than as represented in FIG. 7, components other than or in addition to those shown in FIG. 7 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
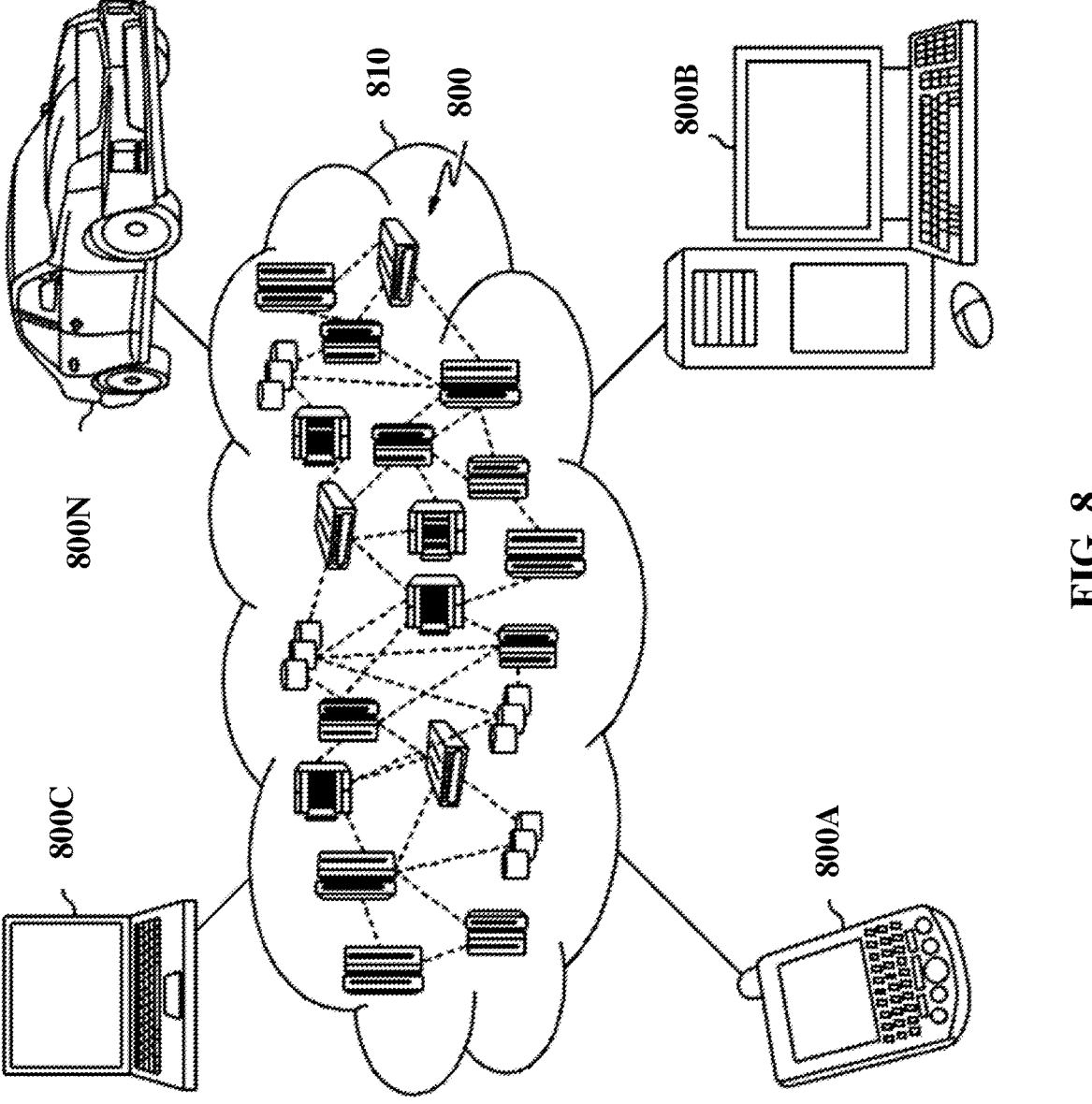
FIG. 8 is a cloud computing environment, according to some embodiments of the present disclosure.

FIG. 8 is a cloud computing environment 810, according to some embodiments of the present disclosure. As shown, cloud computing environment 810 includes one or more cloud computing nodes 800. The cloud computing nodes 800 can perform the method described in FIG. 6 and/or the functionality discussed in FIGS. 1-5. Additionally, cloud computing nodes 800 can communicate with local computing devices used by cloud consumers, such as, for example, personal digital assistant (PDA) or cellular telephone 800A, desktop computer 800B, laptop computer 800C, and/or automobile computer system 800N. Further, the cloud computing nodes 800 can communicate with one another. The cloud computing nodes 800 can also be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
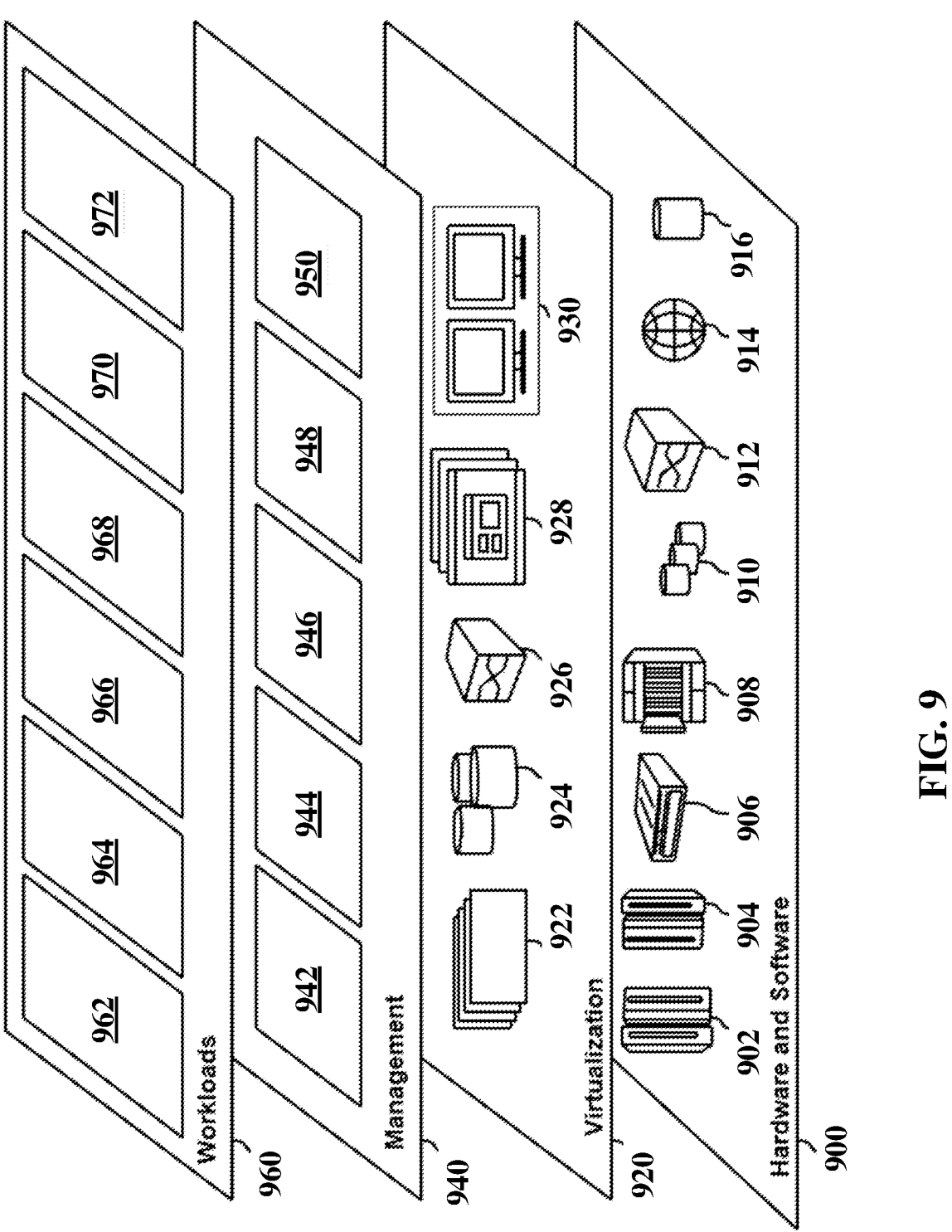
FIG. 9 is a set of functional abstraction model layers provided by cloud computing environment, according to some embodiments of the present disclosure.

FIG. 9 is a set of functional abstraction model layers provided by cloud computing environment 810 (FIG. 8), according to some embodiments of the present disclosure. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. Metering and Pricing 944 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service level management 948 can allocate suitable processing power and memory to process static sensor data. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; software development and lifecycle management 964; virtual classroom education delivery 966; data analytics processing 968; transaction processing 970; and hypervector factorizing manager 972.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
a computer processing circuit; and
a computer-readable storage medium storing instructions, which, when executed by the computer processing circuit, are configured to cause the computer processing circuit to perform a method comprising:
training an encoder comprising a feed-forward neural network to produce a hypervector s as a compound hypervector;
utilizing the encoder to represent data structures in a vector space, the vector space being defined by a set of codebooks that encode a set of cognitive concepts, wherein each of the set of codebooks comprise a plurality of candidate code hypervectors of dimension D representing a plurality of items of a concept of the set of cognitive concepts;
determining a granularity of a plurality of hypervectors so that each of the plurality of hypervectors includes a set of S blocks, each block having size L, wherein $D=S\times L$;
receiving an input hypervector representing a data structure; and
performing an iterative process in order to factorize the input hypervector into a plurality of individual hypervectors representing the set of cognitive concepts, the iterative process comprising, for each concept of the set of cognitive concepts:
determining an unbound version of a hypervector representing the concept by a blockwise unbinding operation between the input hypervector and a plurality of estimate hypervectors of a plurality of other cognitive concepts;
determining a similarity vector indicating a similarity of the unbound version of the hypervector with each candidate code hypervector of the concept; and generating an estimate of the hypervector representing the concept by a linear combination of the candidate code hypervectors, and a plurality of weights of the similarity vector.

2. The system of claim 1, wherein determining the similarity vector includes sparsifying the similarity vector before generating the estimate of the hypervector based on the sparsified similarity vector.

3. The system of claim 2, wherein determining the similarity vector includes adding a random noise vector to the similarity vector.

4. The system of claim 2, wherein sparsifying the similarity vector includes activating a portion of elements of the similarity vector, and deactivating by setting to a defined value a remaining portion of elements of the similarity vector.

5. The system of claim 4, wherein the activated elements of the similarity vector are a top j elements of the similarity vectors, wherein j is a configurable parameter that is smaller than a total number of elements of the similarity vector by a defined number.

6. The system of claim 4, wherein the activated elements of the similarity vector are the elements of similarity vectors having absolute values higher than a defined threshold.

7. The system of claim 6, the defined threshold being a mean of absolute values of elements of the similarity vector.

8. The system of claim 4, wherein sparsifying the similarity vector further comprises:

determining a maximum value of the activated vector;

comparing the maximum value with a threshold; if the maximum value exceeds the threshold, maintaining the maximum value; and setting remaining elements of the activated vector to zero.

9. The system of claim 1, wherein generating the estimate of the hypervector comprises:

mapping the similarity vector to an S-dimensional vector such that each element of the S-dimensional vector indicates one candidate code hypervector of a codebook of the concept; and building a new hypervector such that an $i^{th}$ block of the new hypervector is an $i^{th}$ block of a code hypervector indicated in an $i^{th}$ element of the S-dimensional vector.

10. The system of claim 9, the method further comprising, for every $i^{th}$ element of an S-dimensional vector $s_k$, generating a value v, and determining $$ s_k(i) = \begin{cases} 0 \text{ if } v \le \partial_0 \\ \quad \dots \\ m \text{ if } \partial_{m-1} < v \le \partial_m \end{cases} $$

where v is a randomly generated value or a deterministic value, v=i/S, where t=cumsum(a)/sum(a) is a step function, where a is the similarity vector, where cumsum(a) returns a vector containing a cumulative sum of elements of vector a, and sum(a) returns a sum of elements of vector a, and $\partial_m$ refers to an $m^{th}$ element of $\partial$.

11. The system of claim 1, wherein determining the unbound version of the hypervector comprises:

a linear combination of the candidate code hypervectors, with weights given by the similarity vector;

an addition of a noise vector; and an application of a selection function.

12. The system of claim 1, wherein determining the unbound version of the hypervector comprises:

a linear combination of the candidate code hypervectors, with weights given by the similarity vector; and an application of a selection function.

13. The system of claim 12, wherein the selection function is applied blockwise.

14. The system of claim 12, wherein the selection function is a randomized argmax function.

15. The system of claim 1, further comprising:

responsive to a convergence criterion being fulfilled, stopping the iterative process.

16. The system of claim 1, wherein the hypervector includes binary values $\{0, 1\}^D$ and having a sparsity smaller than a sparsity threshold, wherein each block of the set of S blocks comprises a single non-zero value.

17. A method comprising:

training an encoder comprising a feed-forward neural network to produce a hypervector s as a compound hypervector;

utilizing the encoder to represent data structures in a vector space, the vector space being defined by a set of codebooks that encode a set of cognitive concepts, wherein each of the set of codebooks comprise a plurality of candidate code hypervectors of dimension D representing a plurality of items of a concept of the set of cognitive concepts;

determining a granularity of a plurality of hypervectors so that each of the plurality of hypervectors includes a set of S blocks, each block having size L, wherein D=S×L;

receiving an input hypervector representing a data structure; and performing an iterative process in order to factorize the input hypervector into a plurality of individual hypervectors representing the set of cognitive concepts, the iterative process comprising, for each concept of the set of cognitive concepts:

determining an unbound version of a hypervector representing the concept by a blockwise unbinding operation between the input hypervector and a plurality of estimate hypervectors of a plurality of other cognitive concepts;

determining a similarity vector indicating a similarity of the unbound version of the hypervector with each candidate code hypervector of the concept; and generating an estimate of the hypervector representing the concept by a linear combination of the candidate code hypervectors, and a plurality of weights of the similarity vector.

18. The method of claim 17, wherein determining the similarity vector includes sparsifying the similarity vector before generating the estimate of the hypervector based on the sparsified similarity vector.

19. A computer program product including program instructions stored on a computer readable storage medium, the program instructions executable by a processor to cause the processor to perform a method comprising:

training an encoder comprising a feed-forward neural network to produce a hypervector s as a compound hypervector;

utilizing the encoder to represent data structures in a vector space, the vector space being defined by a set of codebooks that encode a set of cognitive concepts, wherein each of the set of codebooks comprise a plurality of candidate code hypervectors of dimension D representing a plurality of items of a concept of the set of cognitive concepts;

determining a granularity of a plurality of hypervectors so that each of the plurality of hypervectors includes a set of S blocks, each block having size L, wherein $D=S \times L$;

receiving an input hypervector representing a data structure; and performing an iterative process in order to factorize the input hypervector into a plurality of individual hypervectors representing the set of cognitive concepts, the iterative process comprising, for each concept of the set of cognitive concepts:

determining an unbound version of a hypervector representing the concept by a blockwise unbinding operation between the input hypervector and a plurality of estimate hypervectors of a plurality of other cognitive concepts;

determining a similarity vector indicating a similarity of the unbound version of the hypervector with each candidate code hypervector of the concept; and generating an estimate of the hypervector representing the concept by a linear combination of the candidate code hypervectors, and a plurality of weights of the similarity vector.

20. The computer program product of claim 19, the method further including sparsifying the similarity vector before generating the estimate of the hypervector based on the sparsified similarity vector.

* * * * *